(12) United States Patent
Ledet

(10) Patent No.: US 10,515,344 B1
(45) Date of Patent: Dec. 24, 2019

(54) LOCATION AWARENESS ASSISTANT THAT ACTIVATES A BUSINESS-ORIENTED OPERATION SYSTEM OR A PERSONAL-ORIENTED OPERATION SYSTEM BASED ON CONDITIONS

(71) Applicant: Open Invention Network LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 589 days.

(21) Appl. No.: 14/705,432

(22) Filed: May 6, 2015

Related U.S. Application Data

(60) Provisional application No. 62/114,152, filed on Feb. 10, 2015.

(51) Int. Cl.
*G06Q 10/10* (2012.01)

(52) U.S. Cl.
CPC .............. *G06Q 10/1093* (2013.01)

(58) Field of Classification Search
CPC ......... G06Q 10/00; G06Q 40/06; G06F 17/60
USPC ........................................... 705/7.18
See application file for complete search history.

(56) References Cited

U.S. PATENT DOCUMENTS

| | | | | |
|---|---|---|---|---|
| 8,495,731 B1* | 7/2013 | Mar | ................... | G06F 21/74 726/21 |
| 8,995,972 B1* | 3/2015 | Cronin | ................... | H04W 4/18 455/414.3 |
| 9,372,711 B2* | 6/2016 | Galicia | ................ | G06F 9/45537 |
| 2011/0314375 A1* | 12/2011 | Zaika | ................... | G06F 3/0482 715/708 |
| 2012/0231764 A1* | 9/2012 | Lindteigen | ............ | H04L 63/083 455/410 |
| 2014/0236478 A1* | 8/2014 | Mermelstein | ........... | G06F 16/16 701/454 |
| 2015/0039659 A1* | 2/2015 | Sauber | .................. | G06F 16/122 707/827 |
| 2015/0184992 A1* | 7/2015 | Lee | ....................... | G06F 3/1438 700/66 |
| 2015/0264047 A1* | 9/2015 | Roy | .................... | H04L 63/0869 726/4 |

OTHER PUBLICATIONS

Sakamura "BTRON:The Business Oriented Operating System", Apr. 1987, IEEE, pp. 53-65.*
Pozna "The Personal Assistant application, problem definition", Dec. 2013, CogInfoCom 2013 • 4th IEEE International Conference on Cognitive Infocommunications, pp. 1-6 (Year: 2013).*
Claudiu et al "The personal assistant application, problem, definition" Dec. 2013, 4th IEEE International Conference on Cognitive Infocommunications, pp. 1-13 (Year: 2013).*

* cited by examiner

*Primary Examiner* — Romain Jeanty

(57) ABSTRACT

A location based assistant is provided on client device. The client device may activate a business-oriented operation system or a personal-oriented operating system based on a location of the apparatus, a time of day, or a user defined setting. Upon activation of the business-oriented operation system or the personal-oriented operating system, client device may interact and communicate with a business or personal calendar of a user, business or personal messages of the user, business or personal activities of the user.

20 Claims, 7 Drawing Sheets

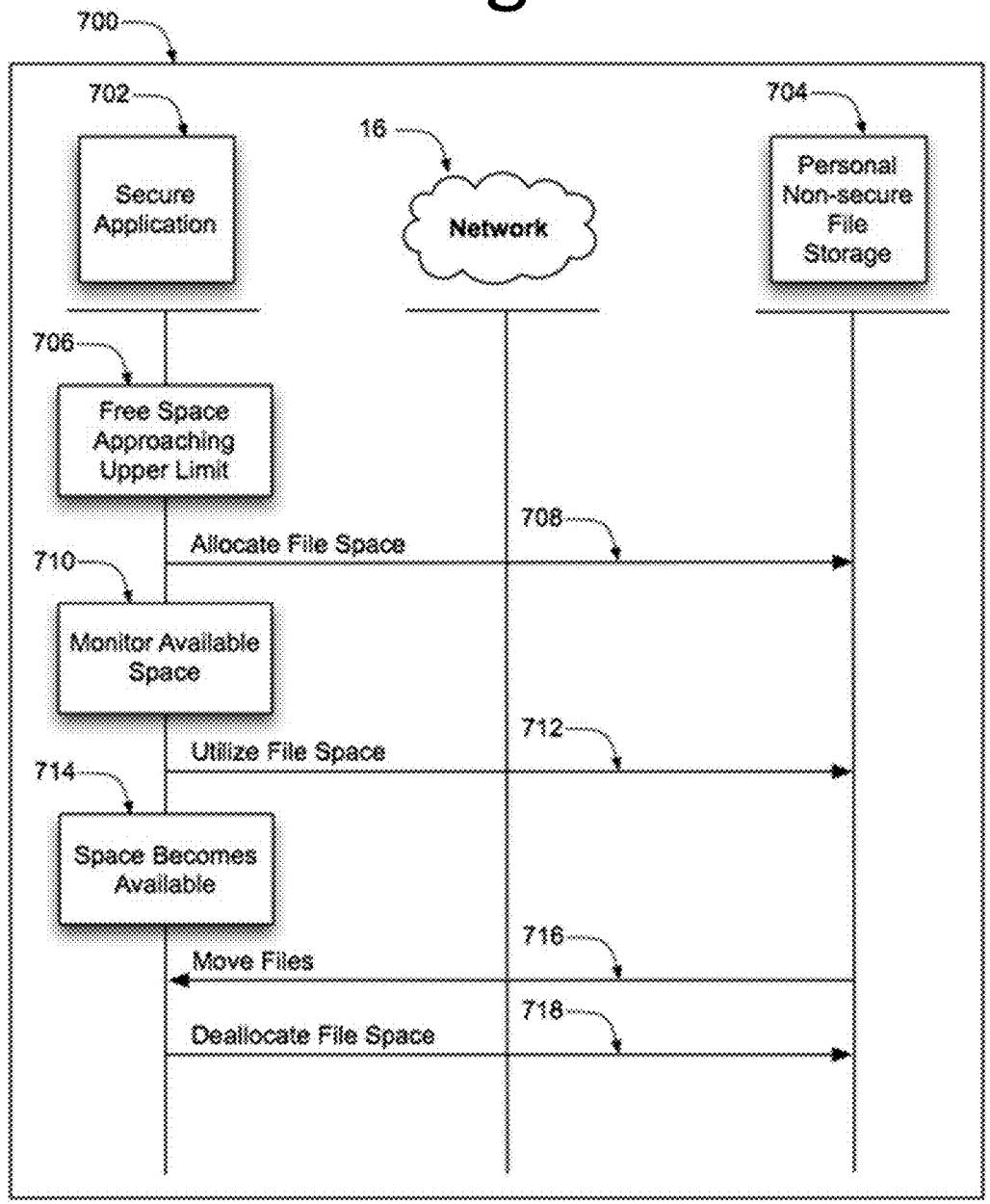

LOCATION AWARENESS ASSISTANT THAT ACTIVATES A BUSINESS-ORIENTED OPERATION SYSTEM OR A PERSONAL-ORIENTED OPERATION SYSTEM BASED ON CONDITIONS

CROSS-REFERENCE TO RELATED APPLICATION

This application claims the benefit of U.S. Provisional Application No. 62/114,152, filed on Feb. 10, 2015. The subject matter of the earlier filed application is hereby incorporated by reference in its entirety.

FIELD

The present invention relates to location awareness assistance, and more particularly, to a business based personal assistant application.

BACKGROUND

VMware™ provides cloud and virtualization software and services. The desktop software for VMware™ runs on Microsoft Windows™, Linux™, and Mac OS X™, while its enterprise software hypervisors for servers, such as VMware ESX and VMware ESXi, are bare-metal hypervisors that run directly on server hardware without requiring an additional underlying operating system (OS).

A hypervisor, sometimes called a virtual machine manager, is the key, integral component allowing the virtual functionality. It is a piece of computer software, firmware or hardware that creates and runs virtual machines. A hypervisor allows multiple operating systems to share a single hardware host. Each OS appears to have the host's complete processor, memory, and other resources all to itself, but in reality, the hosts are being shared.

Two main types of hypervisors exists. These are Type I hypervisor and Type II hypervisor. Type 1 hypervisors are the first to be installed on the server, as the OS will be the hypervisor. Type II hypervisors is loaded on the top of a live OS allowing for resources to pass through the virtual machine.

A host machine, referred to as a physical host, runs one or more virtual machines. Each virtual machine is called a guest machine and is the workload installed on top of the hypervisor. The hypervisor presents the guest OS with a virtual operating platform, and manages the execution of the guest OSs. Multiple instances of a variety of OSs may share the virtualized hardware resources.

Some of the biggest software creators are now creating design and best practices around a virtual infrastructure. The industry has shifted from a single hardware configuration to platforms that create a more efficient data center in which resources are shared between numerous workloads.

Mobile Virtualization Platform

Products both in research and in the market today allow hypervisor technology to be installed on mobile devices, allowing people to buy their own devices and run a separate version of the OS dedicated to business-oriented applications. Users can download the virtual application, allowing the user to have both personal and business-oriented profiles on the device.

VMware's™ Mobile Virtualization Platform (MVP) makes use of system virtualization to deliver an end-to-end solution for facilitating employee-owned phones in the enterprise environment. Due to security needs, Type II hypervisors are preferred application for the mobile (or client) devices. However, this implementation may encounter performance hits as mode and context switches are increased.

The MVP solution merges the hypervisor back into the host by loading a MVP module into the host OS kernel. The MVP module effectively hijacks the host by re-writing the exception vectors, so it obtains control whenever the guest kernel is entered. The process effectively turns the host kernel into a hypervisor. The result is that it is not a Type I or Type II hypervisor any more, but is referred to as a hybrid hypervisor, i.e., a mix of the two types of hypervisors. These hybrid hypervisors require the insertion of a kernel module into the host OS (a major security-critical operation), which require special privileges. On client devices, this requires cooperation with the device manufactures as they frown on any access to the OS.

MVP allows for the use of multiple profiles on a single device. For example, one profile can be for personal use, and on for business use. MVP is a thin layer of software that is embedded onto a mobile phone, decoupling the applications and data from the underlying hardware. It is optimized to run efficiently on low-power-consuming and memory-constrained mobile phones.

Mobile Device Clouds

The offloading of computation from client devices to remote cloud resources or closely located computing resources known as cloudlets have been researched. The shared devices may belong to the same household or by a large group of people, e.g., in a military or disaster scenario. In these cases, the incentive to collaborate on computational tasks is not an issue and the communal goal of prolonging the lifetime of the collection of devices makes sense. This incentive is further amplified if a connection to a cloud (or network) is costly, unreliable, or simply unavailable.

Research further involves the initial state of power availability in a collection of collaborative mobile devices, and a set of computational tasks with known or estimated power consumption profiles on the mobile devices to determine the best approach to schedule the computation among the set of shared devices so as to maximize their lifetime. The concept of a mobile device cloud (MDC) is derived and determined to be a set of mobile devices functionally working together, sharing resources. Such an offloading context involves a highly collaborative context where the goal of computational offloading is to maximize the lifetime of the MDC.

Mobile Device Management

Mobile device management (MDM) includes over-the-air distribution of applications, data, and configuration settings for all types of client devices such as phones, tablets, mobile computers, printers and Point of Sale (POS) devices, etc.

Products in the market today have tools that assist in setting user policies including setting passwords, application usage, controlling employee access to corporate resources, prohibiting the jail-breaking of corporate devices, and security features that can wipe corporate data clean from the client device if compromised.

The rise in "Bring Your Own Device" (BYOD) in the corporate world is requiring organizations to ensure increased security for both the client device and the enterprise they connect to. By controlling and protecting the data and configuration settings for all client devices in the network (including the BYOD devices), MDM can reduce support costs and business risks. The intent of MDM is to optimize the functionality and security of a mobile communications network while minimizing cost and downtime. As the BYOD approach becomes increasingly popular across mobile service providers, MDM gives the corporations the ability to provide employees with access to the internal networks using a client device of their choice, while these client devices are managed remotely with minimal disruption to employees' schedules.

MDM may provide a solution for managing corporate-owned client devices, as well as personal client devices in the workplace. The primary challenge is the ability to manage the risks associated with mobile access to data while securing company issued and BYOD client devices. Typical solutions include a server component, which sends out the management commands to the client devices, and a client component, which runs on the client device and receives and implements the management commands.

Device management specifications include platform-independent device management protocol called Open Mobile Alliance Device Management (OMADM). OMADM is designed for management of mobile devices and is intended to support the following uses provisioning, device configuration, software upgrades, and fault management.

Over-the-air programming (OTA) capabilities, for example, are considered a main component of mobile network operator and enterprise-grade mobile device management software. These include the ability to remotely configure a single client device, an entire fleet of client devices, or any IT-defined set of client devices. OTA also sends software and OS updates, remotely locks and wipes a client device to protect the data stored on the client device when it is lost or stolen, and remote troubleshooting. OTA commands are sent as a binary SMS message, which includes binary data.

Cortana

The arrival of Cortana™, a digital assistant for Windows™ mobile operating system competes directly with Apple's Siri™ and Google Now™ for the chance to organize a user's appointments, contacts, travel arrangements, and all of the other minutiae of daily life. Cortana analyzes how a user uses his or her phone, learning the topics the user interested in, when the user is busy, and where the user is traveling to.

Cortana™ delivers a summary of relevant news stories at the start of the day, and allows users to set up a "quiet time". During quiet time, calls and texts are silenced, and contacts are notified of this restriction. The notebook feature lets you tweak what the app knows about you, providing a more granular level of control than either Siri™ or Google Now™.

In many ways, Cortana™ combines voice search of SIRI™ with the suggestions of Google Now™, which are based on a user's location, time, and appointment calendar.

Siri

Siri™ plugs into a user's emails, contacts, and calendar, but does not try to find out everything about the user. Siri™ is much more of a natural language voice user interface, and Cortana™ is a bit of a blend of the two approaches."

Google Now

Google Now™ is activated and controlled by voice. This application predicts what information the user needs and when. Recent searches, regular travel routes, and email messages are all scanned to determine what the user may require or need. This application, however, fails to wait for the user to submit an inquiry.

However, none of the above approaches provides a single device with a business based personal assistant and a personal based personal assistant. Thus, an alternative approach may be beneficial.

SUMMARY

Certain embodiments of the present invention may provide solutions to the problems and needs in the art that have not yet been fully identified, appreciated, or solved by current location assistant applications. For example, in some embodiments, a client device may include a business assistant profile mode and a personal assistant profile mode. Either assistant may be activated based on location of the client device, time of day, specific configuration predetermined by the user, etc.

In one embodiment, an apparatus includes at least one processor and memory storing a set of instructions. The set of instructions with the at least one processor is configured to cause the apparatus to perform at least one of activate a business-oriented operation system or a personal-oriented operating system based on a location of the apparatus, a time of day, or a user defined setting. Upon activation of the business-oriented operation system or the personal-oriented operating system, the set of instructions with the at least one processor is further configured to perform at least one of cause the apparatus to perform at least one of interact with a business or personal calendar of a user, business or personal messages of the user, business or personal activities of the user.

In another embodiment, a process includes at least one of activating, by at least one processor, a business-oriented operation system or a personal-oriented operating system based on a location of the apparatus, a time of day, or a user defined setting. The process also includes upon activation of the business-oriented operation system or the personal-oriented operating system, interacting with a business or personal calendar of a user, business or personal messages of the user, business or personal activities of the user.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a flow diagram illustrating a process requesting and using personal, non-secure cloud storage, according to an embodiment of the present invention.

DETAILED DESCRIPTION OF THE EMBODIMENTS

Embodiments of the present invention pertains to a personal assistant application, and in particular, to a business based personal assistant application. In one embodiment, a business-oriented operating system may be executed on the user's device (hereinafter "client device") upon activation. For example, the assistant may be activated based on the location of the client device, time of day, specific configuration predetermined by the user, or any other method that would be appreciated by a person of ordinary skill in the art.

The personal assistant functionality may allow the following functionalities all from a business's organization standpoint: interaction with the user's calendar, interaction with the user's messaging application (e.g., email, text messaging, group messaging, etc.), providing an agenda pertaining to business activities, etc.

Figure 1:
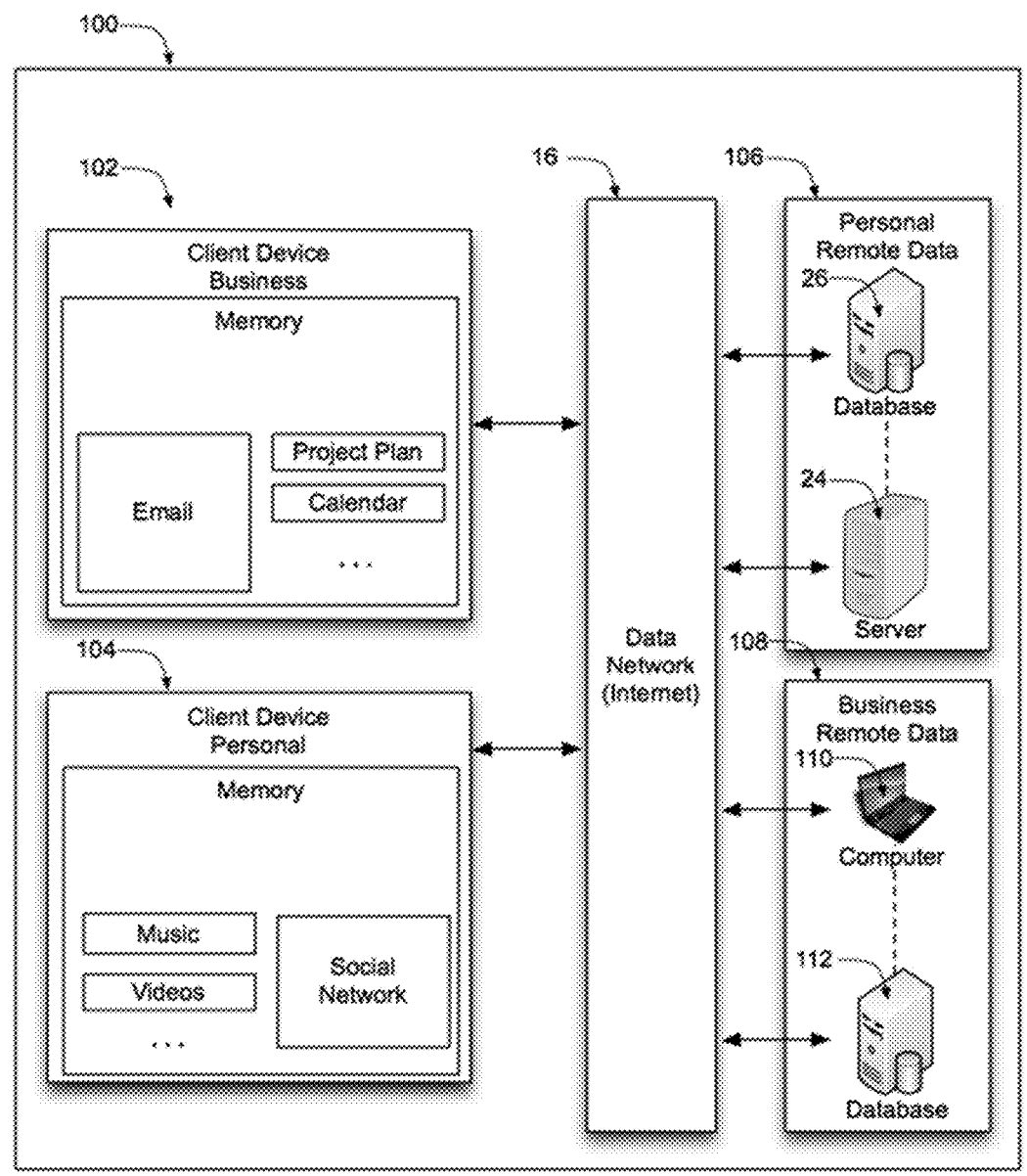
FIG. 1 is system diagram illustrating a location based assistant system, according to an embodiment of the present invention.

FIG. 1 is system diagram 100 illustrating a location based assistant system, according to an embodiment of the present invention. In this embodiment, the system may include a business profile on client device 102 and a personal profile on client device 104. Client device 102 in some embodiments is a representation of the device with an active business profile, and client device 104 in some embodiments is a representation of the device with an active personal profile. The both profiles can be representative of the same client device, i.e., both business profile and personal profile are located on the same device.

In some embodiments, client device 102, 104 may download an application from server 24. Client device 102, 104 may be a mobile client machine, a tablet computer, a laptop or desktop computer. In certain embodiments, client device 102, 104 may also be a gaming system, a DVD player, or any other device that is normally utilized to consume media. In further embodiments, client device 102, 104 may also be any one of a mobile laptop device, a personal desktop computer, a mobile device, or a wearable device such as a watch, bracelet, headset, automobile interactive computer, or the like. It should be appreciated that other types of devices may also be used, such as a PDA, an MP3 player, a wireless device, a gaming device, and the like, so long as the device can transmit and receive information. Client device 102, 104 may connect to network 16, e.g., the Internet.

In this embodiment, a user interfaced with client device 102, 104 may connect to server 24 via network 16. Server 24 may be redundant, or be more than a single entity. A database 26 in some embodiments is directly connected to server 24. In other embodiments, database 26 is remotely connected through the network 16.

Client device 102 may include business application stored within memory may be executed in the business profile. For example, an email application may exist in the business profile. This email application may be authorized by the organization to offer a secure environment for outgoing and incoming emails.

Other applications, such as a project plan and calendar applications, may be reside in memory of client device 102 as part of the business profile. There are other applications (not shown) that may reside on client device 102. These applications may be authorized to be executed on client device 102, and offer more security as they are generally monitored by the organization.

Similar to client device 102, a client device 104 is a representation of the client device within the personal profile. Applications executing on client device 104 include regular application executing on the device in a normal scenario. Applications, such as social network applications, music applications, video applications, etc., are generally deemed unsecure, or less secure than the applications executing in the business profile.

Both profiles, i.e., the business profile on client device 102 and personal profile on client device 104, on the client device interwork and are communicably coupled to a data network 16. Data network 16, in some embodiments, may include Internet or any other data network that allows communication of data.

The client device, which includes client device 102 and 104, may be any computing device that includes at least one process and memory to enable communication either directly or indirectly with the data network 16.

It should be appreciated that remote computers 106, 108 may connect with data network 16, and may communicate with client device 102, 104. In this example, these computers are grouped together. Also, in this example, a group of computers for the business profile 108 and a group of computers for the personal profile 106 may exist.

Remote computers 106 may include a server 24 that provides additional data, and can be interconnected with the client device 104 when in the personal profile. Remote computers 106 also includes a database 26 coupled to server 24. Database 26 may be queried in some embodiment and may provide additional data that may be needed by server 24. In certain embodiments, a database may also exist outside of personal group of remote computers 106, and may be located remotely, such that server 24 communicates through the data network 16. Database 26 may also directly communicate with the client device 104 via data network 16, such that the communication does not pass through server 24.

Remote computers 108 may be interconnected with client device 102 when in the business profile. These components communicate with client device 102 in the business profile through the data network 16. Remote computers 108 communicate through data network 16, allowing an organization to monitor the data traffic.

The computer 110 exists in the business group of computers and can connect with the client device 102 through the data network 16. Database 112 coupled to computer 110 allows additional data to be stored, and can be queried either through the computer 110 or by client device 102 in the business profile. Additionally, remote databases and/or computers may reside outside of the business remote data 108, and may communicate with computer 110, database 112, or client device 102 via data network 16.

It should be appreciated that the business profile application and/or the personal profile application reside on client device, which includes client device 102 and client device 104. However, in other embodiments, these applications may recite on a user's desktop computer, a personal digital assistant (PDA), tablet computer, or any other device that includes a processor, memory, and an operating system. Furthermore, these applications may reside on completely or partially on any one of the other elements in the system shown in FIG. 1, e.g., server 24, database 26, remote server, computer 110, database 112, network 16, etc.

In some embodiments, the applications may be preloaded on the client device or may be downloaded through an application store, such as an App Store™ As discussed above, the client device may be any device, e.g., a personal computer with a touch screen, a laptop with a touch screen, a personal computing tablet, a smartphone, a PDA or any device with a processor, memory, and a touch screen.

Figure 2:
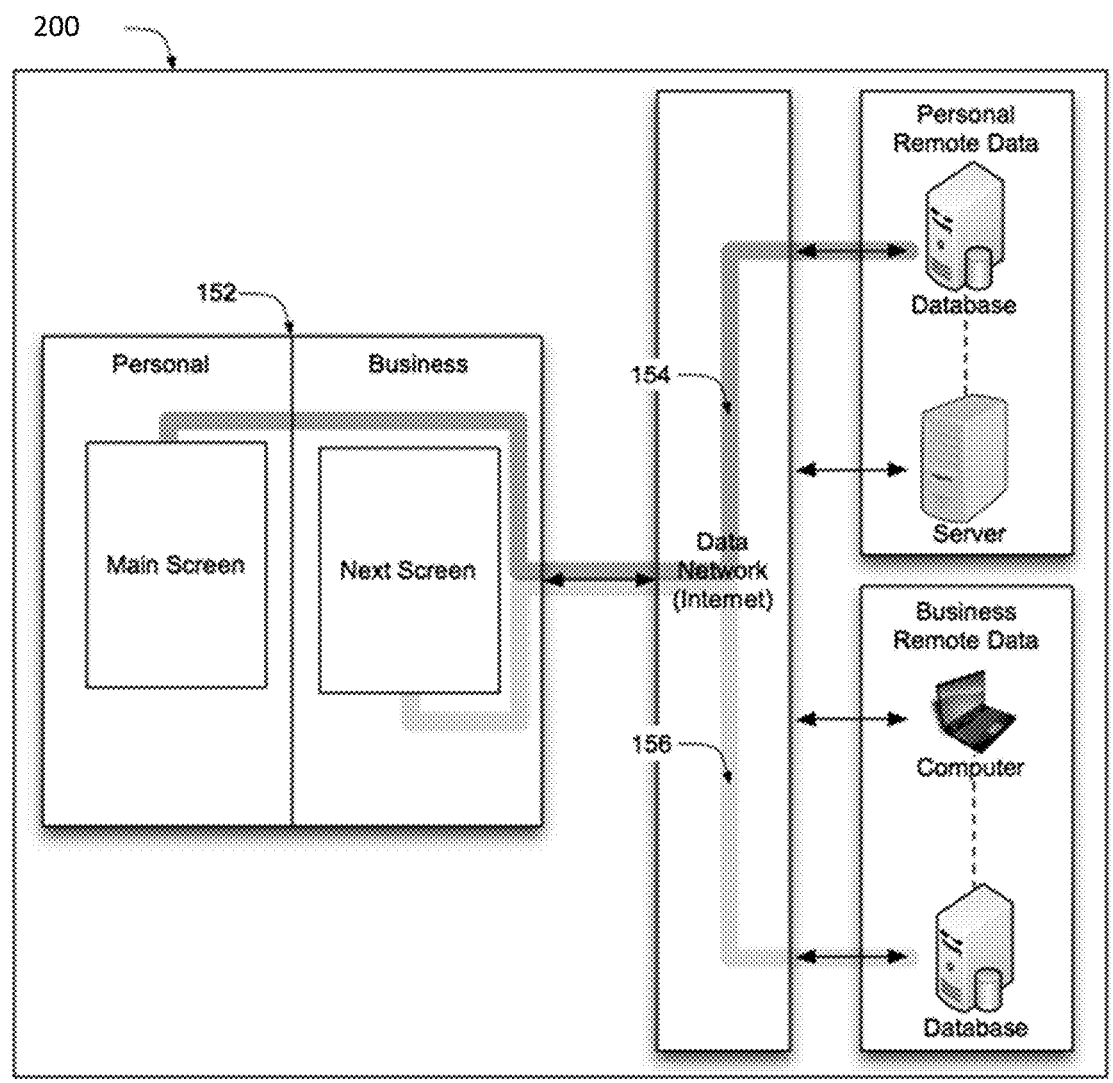
FIG. 2 is a flow diagram illustrating a flow of data between client device, data network, and a remote computer, according to an embodiment of the present invention.

FIG. 2 is a flow diagram 200 illustrating a flow of data between client device 152, data network, and a remote computer, according to an embodiment of the present invention.

In this embodiment, client device may be in personal profile mode or business profile mode. The mode may be determined by a number of factors that are described in further detailed below.

For example, client device 152 may be placed into a profile by one or more conditions. A condition may include a user selecting the profile via the GUI on the display of client device 152. This is through the configuration of client device 152, for example, settings. Another condition may include whether the applications are manually initiated by the user or automatically initiated. For instance, applications installed on client device 152 are pre-determined to be part of a profile, and when initiated, the state of client device 152 is changed to the profile. For example, an email application that is business-oriented and verified as secure by the organization will changes the mode of client device 152 into a business profile mode when initiated by the user.

A further condition may include recipients chosen by the user for communication. For example, when the user establishes communication with a business-oriented user, client device 152 is then moved to a business profile mode. Another condition may also relate to the time of day. For example, client device 152 may automatically move into a personal profile mode at 6:00 pm each day, and move into a business profile mode at 9 am each day.

Another condition may relate to the location of client device 152. For example, client device 152 switch into a business profile mode when client device 152 is near the geographic location of the business's office, and switch back to a personal profile mode when client device is outside of the geographic location of the business's office. A further condition may pertain to client device 152 establishing a particular connection. For example, when client device 152 automatically establishes a connection with a facility allowing computers, smartphones, or other devices to connect to the Internet or communicate with one device wirelessly within a particular area, such as a Wi-Fi connection.

With respect to flow diagram 200 shown in FIG. 2, when client device 152 is in the personal profile mode, the flow of data 154 is between the data network and to the personal remote data computer(s), e.g., a database. This allows a user in the regular mode, or personal profile mode, of client device 152 to interact with database or server of the personal remote data computer(s).

When client device 152 is placed in business profile mode, flow of data 156 is between the data network and to the business remote data computer(s), e.g., a database. This allows a user to interact with the database or computer of the business remote data computer(s) when in the corporate setting, or when client device via 152 is placed in the business profile mode. In this embodiment, the data may be more secure, and additional restrictions and validations may be made on the incoming and/or outgoing data from client device 152 and the business remote data computer(s).

In certain embodiments, a person assistant application (PAA) may provide an intuitive experience for business communities to share any and all data necessary to efficiently run the company. By switching a user's client device from a 'personal' operating system to the 'business' operating system upon arrival to the office, a virtual shared experience for all employees of the company is realized.

Location Based Activation

The description below provides embodiments of the PAA. In certain embodiments, a user may park his or her car, and start to work towards the office. The client device may track the location of the user, and immediately switch the mode of the client device to an enterprise oriented PAA. For example, a notification may be displayed to the user of the client device. This notification may state, "Good morning, you have x number of unchecked emails, and a meeting request from John Doe in conference room 201 at 11:00 to discuss Project XY budget. Do you accept?" In some embodiments, the information may be relayed to the user via voice, spoken by the client device through text-to-speech functionality.

In a further embodiment, the client device may automatically switch to the business profile based on the geographic location of the client device. For example, as the client device is near the geographic location of the office, and/or when the client device connects with the Wi-Fi of the business, the mode of the client device switches to a business profile. The device may also switch profiles according to the geographic location or near the proximity of any similar network signal.

Upon switching to the business profile mode, the current application is automatically executed on the client device. This application may automatically connect with the business remote data 108 through the data network 16 of FIG. 1, for example. A query is automatically performed in some embodiments with the database of the business remote data, and a response is returned delivering the most recent data to the client device.

In certain embodiments, the user is welcomed into the workday by PAA providing essential information that was received overnight, and any requests given by fellow employees for meetings, overlooking documents, etc. The PAA may give companies an efficient and technological medium for all business discussion and sharing of information. For example, if there a need to set up a meeting with the marketing team, then a request is sent to each of the members of the team, and the PAA is requested to reserve the next available conference room. In another example, if the PAA is asked to order lunch from a local restaurant, or start a chat within the messaging tab to get a group together, the PAA may also perform the necessary actions to complete such tasks. Examples and additional detailed is provided below.

Meeting Request

As discussed above, in one embodiment, the user may want to meet with his or her marketing team to discuss the client's requests. There are at least two ways to set up this meeting.

Figure 3:
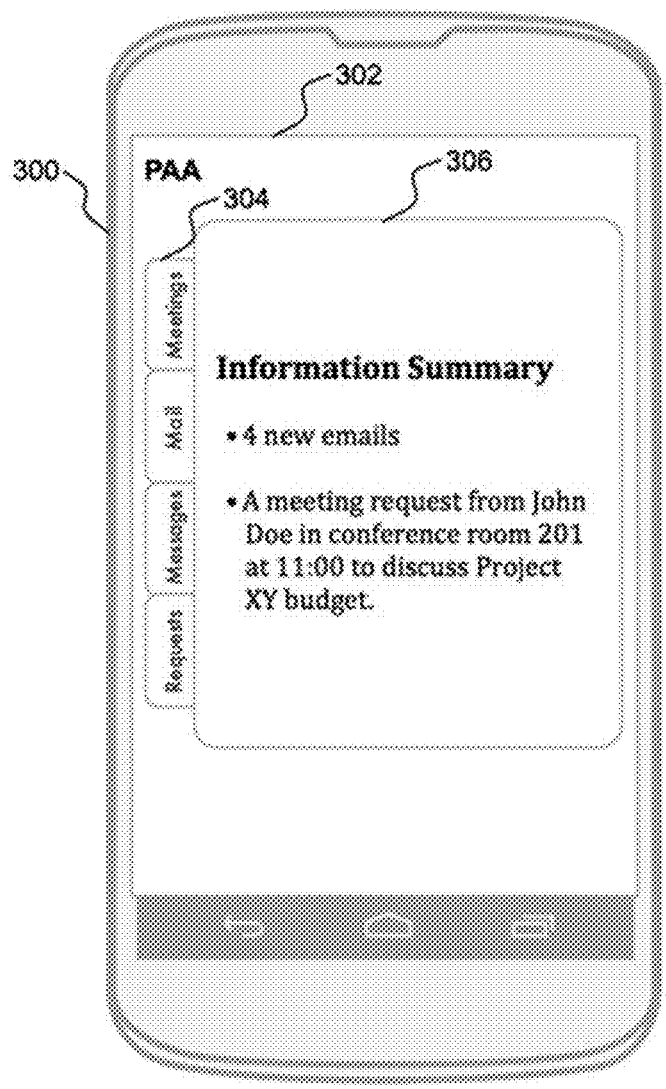
FIGS. 3-6 are graphical user interfaces (GUI) illustrating a display of the client device, according to an embodiment of the present invention.

FIG. 3 is a GUI 300 illustrating a display of the client device, according to an embodiment of the present invention. In this embodiment, PAA screen 302 may show multiple navigation tabs 304 offering navigation by the user. This may include a mail tab, a meetings tab, and messages tab, and a request tab. The initial display area of the application 306 contains a summary of the useful information under the selected tab. In one embodiment, this displays the incoming information since the user last interacted with the application.

Figure 4:
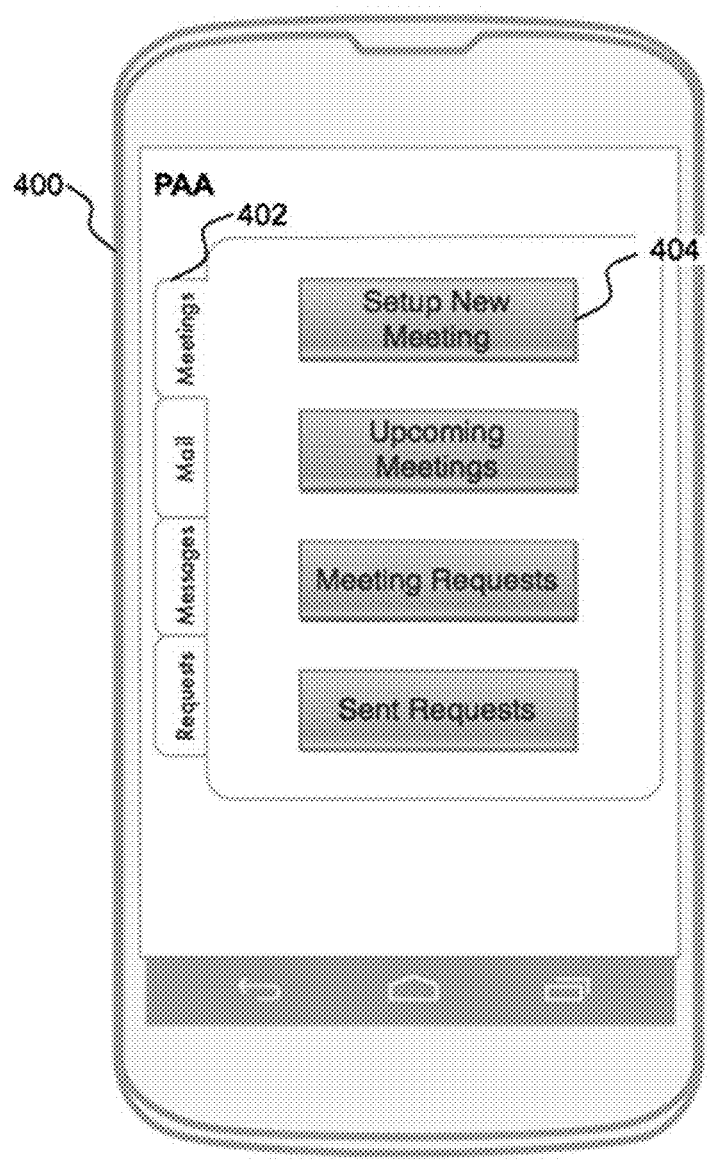

FIG. 4 is a GUI 400 illustrating a display of the client device, according to an embodiment of the present invention. In this embodiment, the user may select the meetings tab 402. This causes the application to replace the opening screen with the meeting screen 404 showing four options for meetings. The options may include setup new meeting, upcoming meetings, meeting requests, and/or sent requests.

The options may be displayed with interactive components. For example, the interactive components are displayed as clickable button components. In other embodiments, the menu options may be spoken to the user via the speaker on the client device, or any other method may be used, to display options to a user on a device. In one embodiment, the user may select the "Set Up New Meeting" option 404.

Figure 5:
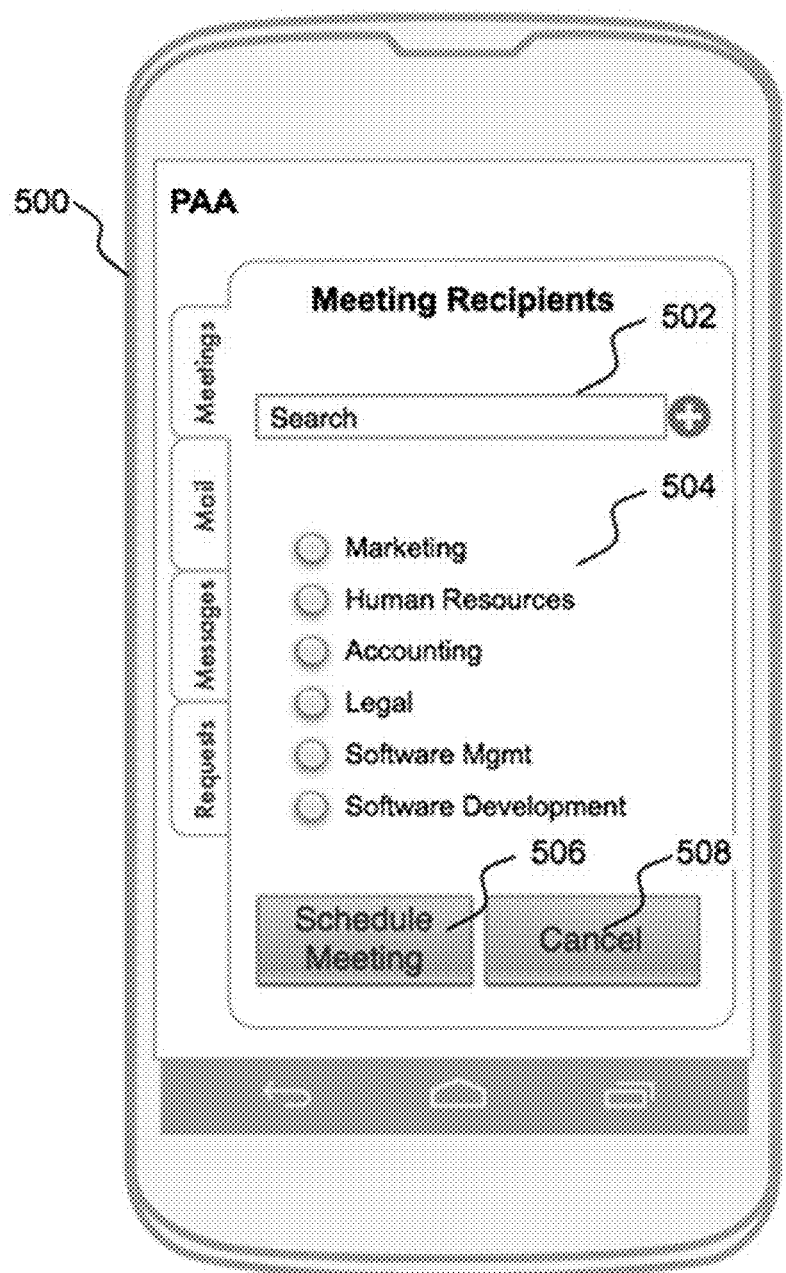

FIG. 5 is GUI 500 illustrating a displaying of a client device, according to an embodiment of the present invention. In this embodiment, GUI 500 shows a meetings area of the application. For example, GUI 500 shows a listing of the major teams on staff (meeting recipients 504) that can receive a meeting request, i.e., marketing, human resources, accounting, legal, software management, and software development. A search bar 502 is also shown enabling a user to search a specific co-worker, and the results are displayed on the display area such that he user can invite specific recipients to the meeting. In this embodiment, GUI 500 includes navigation button. For example, schedule meeting button 506 allows the use to schedule meeting with the one or more selected recipients, and cancel button 508 cancels the meeting request, and returns to the previous screen or any previous portion of the application.

It should be appreciated that the current staff in the user's organization may be retrieved by the application through the business remote data communicated via data network.

Figure 6:
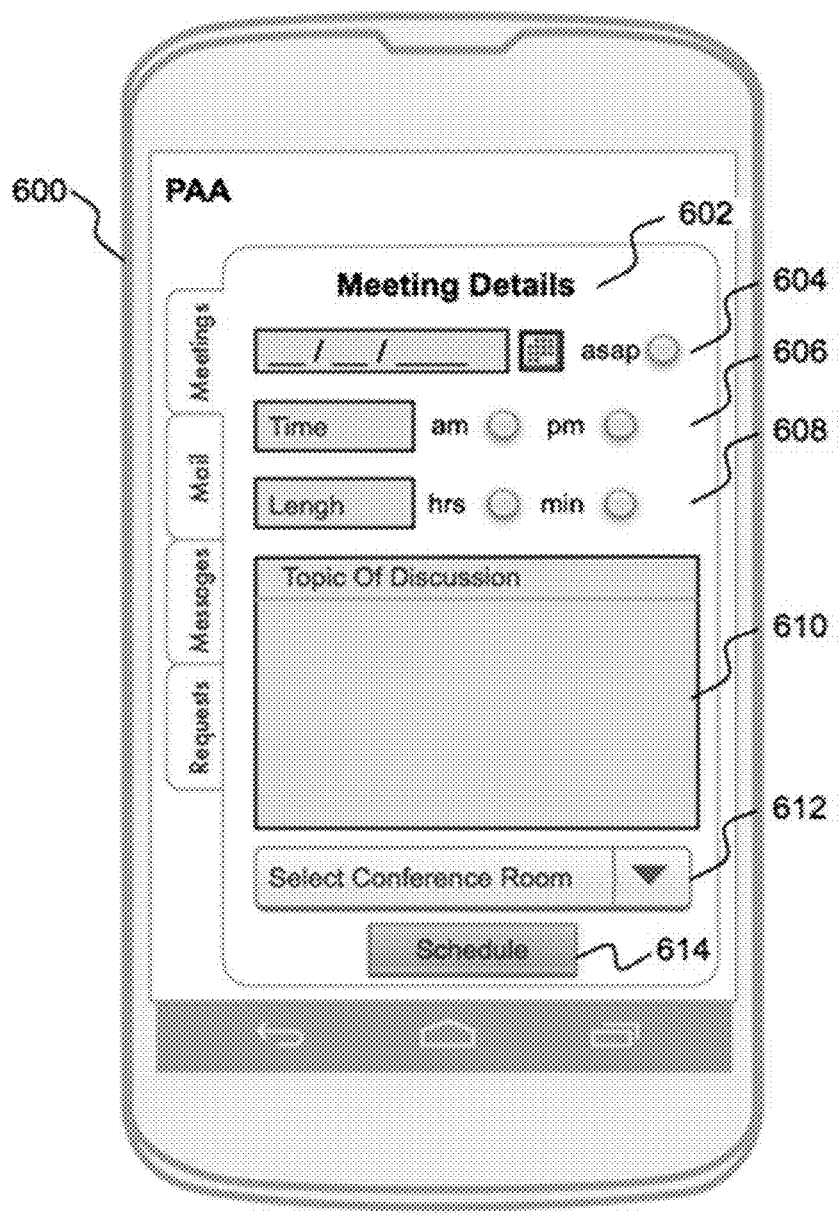

FIG. 6 is GUI illustrating a display of the client device, according to an embodiment of the present invention. In this embodiment, GUI 600 of the client device displays meeting details 602, such as date and time, length of meeting, and any other miscellaneous information. For example, a user may enter the details of meeting 602. Under date component 604, the user may enter the date of the meeting. For example, the user may enter a specific date or click on the calendar icon and select a date on the popup calendar.

If the user selects the "ASAP" button, a message may be sent to a server via the network informing that the meeting is to take immediately or shortly. Furthermore, the message may query for any available conference room, which are in the same geographic area of the user, and schedule the next available time slot. A return message from the server may be sent to the client device, and may include the next available conference room name and amount of time free. In a further embodiment, the time of free conference room 606, the amount of time free in selected conference room 608, and the name of conference room 612 are automatically filled utilizing the data received in the response message.

In some embodiments, the user may enter the start time of the meeting in time component 606, and may also select the time of the day, i.e., "am" or "pm". The user may also enter a proposed length of the meeting in the length component 608. The user is able to select "hours" or "min" to reflect the unit in the length component. The user may enter a short description of the meeting in the "Topic of Discussion" text entry component 610. This data field allows a multiline text entry. In other embodiments, the user may have the option to include formatted text via a rich text editor implemented in this text entry component. The user may also include clickable links, including links to other type of data that may be interesting to the potential recipients (for example, related emails, project plans and other types of similar data).

The user may select a conference room in a pull down component 612. The list of conference rooms is obtained by communicating with the server, which has access to the organization's live scheduling data. Finally, the user may select the schedule button 614 at the bottom of GUI 600 to proceed to the finalization of the meeting scheduling.

Non-Business Related Activity

In some embodiments, the user may perform non business-related activities while the device is in a business profile, or secure profile, mode. The user may receive an incoming message from a user that is not considered a business-related user. In this case, the message is handled outside of the secure, business profile as explained below.

The determination of the type of interaction can be based on the characteristics of the remote user. For example, when a user receives a message that is outside of the business-related contacts, then the message is considered a non-business interaction. In another example, when the email address reflects a non-business related connection, the email is considered a non-business interaction. For example, an email address with a Gmail™, Yahoo™, or other similar domains may be considered non-business interactions. In a further example, when an application is initiated by the user outside of the secure applications supported in the business profile, the application is considered as non-business related application. In a separate example, when a notification, message, call, or any other interaction is received and handled by an application that is outside of the secure applications supported in the business profile, then the notification, message, call, etc., is considered non-business related.

In each of the cases, and other similar cases, an application outside of the established, secure business-related applications may handle the interaction. In such cases, the data associated with the application is considered unverified, and the data is not passed through the verification process, which may include system interaction.

Profile-Based Resource Management

In some embodiments, resources are shared between the two profiles. These resources may include bandwidth, security, access, etc. In those embodiments, resources are borrowed from one profile and used by the other profile on an as needed basis.

The borrowing of resources are based on scenario, intended use, requestor's credentials, etc. Borrowing resources may include relaxing security, making security more stringent, providing access or a certain level of access, etc. The functionality of the resource, such as security, access, bandwidth, etc., may automatically change based on whether the client device is in the personal profile mode or the business profile mode.

Security Resource Management

Applications executing on the client device are generally considered a secure application when executing while the client device is in the business profile mode. Each application in the business profile mode are verified by the organization, and all incoming and outgoing data from the application is verified to remain secure.

Applications executing on a device are considered non-secure when executing while the client device is in the personal profile mode. In those embodiments, the incoming and outgoing data from the application is not considered secure. Through the use of the application, it may be possible to temporarily allow applications to become less or more secure. This may be necessary when a user wishes to perform business-related activity without switching the profile of the client device.

In some embodiments, an application executing in a secure profile, e.g., a business profile mode, are automatically or manually considered as non-secure through some of the embodiments discussed below. Also, in some embodiments, non-secure applications, such as those executing in the non-secure profile or personal profile mode, are considered secure through some of the embodiments discussed below.

In one embodiment, secure applications are validated by the organization such that they can be considered non-secure. Also, non-secure applications can be validated by the organization such that they can be considered secure. This validation can be established based on a predetermined or determined timeframe.

The predetermined timeframe may be encoded into the application, and may be a determined number of seconds, minutes, hours, etc., that the application is altered in its secure nature, such that it becomes less or more secure. The determined timeframe may be established on a case-by-case scenario. For example, in some embodiments, the user determines the number of seconds, minutes, hours, etc., that the application is altered in its secure nature such that it becomes less or more secure.

When altering the application's security, if for only a short amount of time, data incoming and outgoing data to and from the application may be validated to determine whether it is secure or non-secure. In order to make the application non-secure, the incoming and outgoing data related to the application is not validated. In one embodiment, secure data may be validated in the organization's server prior to being delivered to and from the client device. This process is bypassed when changing the application from a secure application to a non-secure application.

Also, in order to make the application secure, the incoming and outgoing data to and from to and from the client device is validated. In one embodiment, non-secure data is not validated in the organization's server prior to being delivered to and from the client device. This process may be bypassed when changing the application from a non-secure application to a secure application such that the data is routed to the organization's server and validated prior to being delivered to and from the client device.

Automatic Data Population of Applications

Applications executing on the client device may be populated according to the current profile of the client device, whether in personal profile mode or business profile mode. This functionality allows the user to initiate an application without having to seek the file to be opened. The most recently related data may be automatically populated in the executing application in such embodiments.

Programming a file to automatically open upon an application's initialization can be performed using methods widely utilized. For example, to automatically open a particular file, a user can place the file in a specific directory location causing the file to be automatically executed. By placing the file, or a assigning a symbolic link to the file in the specified directory, the executing application will first attempt to open the file when the application is initiated.

If the device is in the business profile mode, data for the currently executing program, for example, may be obtained automatically from the user's business-related data. Since the profile of the client device is business profile mode, the data will be pulled from the user's business applications, as only those applications that are business-related and are executing on the client device.

In some embodiments, the most recent file of the applications file-type related to the user may be determined. The following non-inclusive methods are utilized in some embodiments to determine the most probable file to automatically open:

TABLE 1

| Category | Location | Method |
| --- | --- | --- |
| Email | Email Application | The current email application is examined looking for recent (either a preconfigured or static timeframe) file types matching the application being opened. The file may be an attachment to an email, or through the parsing of the subject and/or body of the recent emails, the file name may have been discussed. |

TABLE 1-continued

| Category | Location | Method |
| --- | --- | --- |
| Text | Text Application | The current texting application is examined looking for recent (either a preconfigured or static timeframe) references mentioned in the text of the users. Any attachments to texts are also examined. |
| Voicemails | Voicemail Application | Voicemails received in either a preconfigured or static timeframe are examined. Voicemails are converted to text via speech-to-text functionality and searched for any mentions of file names of the application's file type. |
| Files | User's local files | The file list on the user's client device is searched for the file type of the application being opened. Files with a timestamp of either a preconfigured or static timeframe are sought wherein the user may have recently opened or otherwise used that file. |
| Files | User's cloud storage | The file list on the user's cloud storage in the network is searched for the file type of the application being opened. Files with a timestamp of either a preconfigured or static timeframe are sought wherein the user may have recently opened or otherwise used that file. |

For example, when the user initiates a project management application in the business profile mode, the application automatically scans the user's emails seeking project management files that may have been attached and automatically pulls the file(s) into the executing project management application through either direct interaction with the client device's email application or through interacting with application programming interfaces (APIs) from the client device's email application.

In addition, other locations may be scanned for project management files. For example, project management files may exist in the cloud that have recently been edited by the user, may exist in the user's local file directory and have been recently edited, etc.

Sharing Resources

In another embodiment, resources are made available for situations when additional resources are needed for processing. Resources that are available for sharing include bandwidth, random access memory, disk drive memory, virtual memory, processing power, etc.

Many document storage accounts allow a user's files to be stored in the cloud, or the Internet, such that they are available from any device that is connected to the Internet. These accounts generally offer many gigabytes of storage and offer a low price point for access to even more storage.

Organizations also have storage mechanisms allowing their users to store documents internally (in an internal structure) or in the network. The organizations may have implemented policies and functionalities that perform security functions, assuring that the files are virus free and are stored in a secure manner. Client devices working within the organization must be in the business profile mode where the client device is verified and all applications are authorized and considered secure.

The storage mechanisms utilized by the organization may be the same or similar as the storage mechanisms in use by the employees in personal use. Therefore, it is possible to retain additional storage space, for example, if needed by the employee. In such an embodiment, the application monitors the resources and makes the organization and the user aware of possible alternative solutions when resources begin to reach capacity.

Security is of utmost concern when in a business scenario. The same or similar security policies may adhere to whether the resource is one that has been verified by the organization or a shared resource outside the organization. Thus, all shared resources must retain the same or similar security policy to make the solution feasible. The current document offers a number of examples covering how the security policy is functionality implemented. While it is impossible to cover scenarios involving exporting the security policies in all circumstances, an overview of a high-level of implementation of the security is provided herein.

For example, an employee may regularly utilize a document storage repository that is validated as a secure repository by the organization. The application may normally monitor the repository to determine the amount of space available by interfacing with APIs, i.e., the total space available and the amount of space used.

When the user begins to approach the limit of allocated space, the application may notify the user, and begin to seek other alternatives for temporary storage of documents. This temporary storage is utilized until additional space is allocated for the user and/or files are removed from the verified space freeing up additional space.

Assuming that the user utilizes $3^{rd}$ party file storage application(s), the user's client devices may store documents in the cloud. While these applications are useful for the user's personal files, they are not considered secure from the view of the organization. The user's $3^{rd}$ party file-storage applications may be made available to the current application by a number of methods. For example, the user informs the current application through a GUI interaction (not shown) that a $3^{rd}$ party application is used to store files. In another embodiment, the user may relay the login information allowing the current application to access the file storage application.

In another example, the current application may interact with the client device to automatically determine whether any $3^{rd}$ party applications store documents in the cloud. The current application may interface with APIs to determine the amount of total space available for the user as well as the amount of free space in the remote repository.

When the user is approaching the storage limit in the secure repository, the application informs the user that additional storage is available utilizing the user's personal $3^{rd}$ party application, and requests the user for verification. This is performed through notifications and GUI components on the user's client device. If the user verifies that the personal file storage can be used to store work-related, secure files, then a process is initiated to allow the user to store the files in the personal repository.

Specific functionality may allow the storage of secure files in the personal repository. These functionalities include, for example, the scanning of all documents prior to the actual storage—the same protocol that is followed when storing work files in the organization's secure repository. The current application may also monitor the business repository to determine when space is available, i.e., either through deletion of files or allocation of new space. This monitoring can be performed on a predetermined time frame, e.g., every 7 days. Upon determining that space is now available, the current application automatically moves the files stored in the user's personal repository over to the business repository. The documents are considered secure as the same security protocol was utilized when the documents were stored in the personal repository.

Thus, the issues of the user not having access to free space in the business repository can be overcome by allowing the user to store work-related documents in their own personal repository without worrying about introducing issues from a security standpoint.

The current functionality may be performed when the user is in the business profile, thus utilizing the client device in a business scenario, which is also considered a secure environment.

FIG. 7 is a flow diagram 700 illustrating a process requesting and using personal, non-secure cloud storage, according to an embodiment of the present invention. In this embodiment, the user may use a secure application in the business profile mode of the client device, e.g., client device 102 of FIG. 1. For example, a current application on the client device is interworked with a secure application. A personal non-secure file storage (hereinafter "remote file storage") 704 may be a cloud storage application such as Dropbox™, Google Docs™, or a similar application.

At 706, secure application 702 in some embodiments may approach a limit of file allocation for the current application such that the user is limited in the space available for additional storage. The current application, interworking with APIs of the secure application 702, or interworked directly with the secure application 702, is notified of impending file allocation issues, and seeks alternative file allocation storage. At 708, an allocate file space message is sent to a remote file storage 704. This message queries remote file storage 704 to determine the amount of storage space available.

The current application, interworking with the secure application 702, monitors the available space available for file storage at 710. For example, through interaction with the API of the secure application, the amount of space available is returned upon the completion of the query, allowing the current application to determine the amount of free space and perform functionality based on the returned query.

At 712, files of secure application 702 are stored in remote file storage 704, utilizing the free file space in remote file storage 704. At 714, the secure application continuously monitors storage space for the current application in the business profile mode, and notifies the current application regarding available storage when additional file space becomes available. This can occur as files are deleted from the secure application. In another embodiment, the secure application software dispatches an event when free space is allocated. The current application receives this event such that the software is aware of the current status of the free space available in the secure application.

At 716, the current application in some embodiments may automatically move the previously stored files in the remote file storage 704, as space is now available in secure application 702. In a further embodiment, at 718, the previously allocated file space is de-allocated from remote file storage 704.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   at least one processor; and
   memory configured to store a set of instructions to provide a business-oriented operation system and a personal-oriented operation system, and store at least one business application and at least one personal application, wherein
   the set of instructions, with the at least one processor, and configured to cause the apparatus to:
      determine whether to activate the business-oriented operation system or the personal-oriented operating system based on a location of the apparatus or a time of day,
      activate the determined one of the business-oriented operation system or the personal-oriented operating system, and
      provide access to the at least one business-oriented application or the at least one personal oriented application based on whether the business-oriented operation system or the personal-oriented operation system is activated, respectively, and temporarily allow one or more unsecure applications on the business-oriented operating system to become more secure or temporarily allow one or more secure applications on the personal-oriented operating system to become less secure without switching from the business-oriented operating system to the personal-oriented operating system or from the personal-oriented operating system to the business-oriented operating system.

2. The apparatus of claim 1, wherein the memory is further configured to store the business-oriented operation system and the person-oriented operating system.

3. The apparatus of claim 1, wherein the set of instructions with the at least one processor is further configured to cause the apparatus to communicate with a remote business server when the business-oriented operating system is activated.

4. The apparatus of claim 1, wherein the set of instructions with the at least one processor is further configured to cause the apparatus to communicate with a remote personal server when the personal-oriented operating system is activated.

5. The apparatus of claim 1, wherein the set of instructions with the at least one processor is further configured to cause the apparatus to load one or more applications associated with the business-oriented operation system in a secure environment, when the business-oriented operation system is activated.

6. The apparatus of claim 1, wherein the set of instructions with the at least one processor is further configured to cause the apparatus to load one or more applications associated with the personal-oriented operation system in an unsecure environment, when the personal-oriented operation system is activated.

7. The apparatus of claim 1, wherein the set of instructions with the at least one processor is further configured to cause the apparatus to communicate data with one or more business-related computers, when the business-oriented operation system is activated.

8. The apparatus of claim 1, wherein the set of instructions with the at least one processor is further configured to cause the apparatus to communicate data with one or more personal-related computers, when the personal-oriented operation system is activated.

9. The apparatus of claim 1, wherein the set of instructions with the at least one processor is further configured to cause the apparatus to switch from the personal-oriented operation system to the business-oriented operating system when a message associated the business-oriented operating system is initiated by the user.

10. The apparatus of claim 1, wherein the set of instructions with the at least one processor is further configured to cause the apparatus to switch from the personal-oriented operation system to the business-oriented operating system when an application associated with business-oriented operating system is initiated or installed by the user.

11. A process, comprising:
   determining, by the at least one processor, whether activate a business-oriented operation system or a personal-oriented operating system based on a location of a client device or a time of day;
   activating, by at least one processor, the determined one of the business-oriented operation system or the personal-oriented operating system; and
   providing, by the at least one processor, access to at least one business application or at least one user application based on whether the business-oriented operation system or the personal-oriented operation system is activated, respectively, and temporarily allow one or more unsecure applications on the business-oriented operating system to become more secure or temporarily allow one or more secure applications on the personal-oriented operating system to become less secure without switching from the business-oriented operating system to the personal-oriented operating system or from the personal-oriented operating system to the business-oriented operating system.

12. The process of claim 11, storing the business-oriented operation system and the person-oriented operating system in a memory of a client device.

13. The process of claim 11, further comprising:
communicating, by the at least one processor, with a remote business server when the business-oriented operating system is activated.

14. The process of claim 11, further comprising:
communicating, by the at least one processor, with a remote personal server when the personal-oriented operating system is activated.

15. The process of claim 11, further comprising:
loading, by the at least one processor, one or more applications associated with the business-oriented operation system in a secure environment, when the business-oriented operation system is activated.

16. The process of claim 11, further comprising:
loading, by the at least one processor, one or more applications associated with the personal-oriented operation system in a secure environment, when the personal-oriented operation system is activated.

17. The process of claim 11, further comprising:
communicating, by the at least one processor, data with one or more business-related computers, when the business-oriented operation system is activated.

18. The process of claim 11, further comprising:
communicating, by the at least one processor, data with one or more personal-related computers, when the personal-oriented operation system is activated.

19. The process of claim 11, further comprising:
switching, by the at least one processor, from the personal-oriented operation system to the business-oriented operating system when a message associated the business-oriented operating system is initiated by the user.

20. The process of claim 11, further comprising:
switching, by the at least one processor, from the personal-oriented operation system to the business-oriented operating system when an application associated with business-oriented operating system is initiated or installed by the user.

* * * * *